US006829780B2

(12) United States Patent
Kraft et al.

(10) Patent No.: US 6,829,780 B2
(45) Date of Patent: Dec. 7, 2004

(54) SYSTEM AND METHOD FOR DYNAMICALLY OPTIMIZING A BANNER ADVERTISEMENT TO COUNTER COMPETING ADVERTISEMENTS

(75) Inventors: Reiner Kraft, Gilroy, CA (US); Alison Douty Mortinger, Wallnut Creek, CA (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 09/801,984

(22) Filed: Mar. 7, 2001

(65) Prior Publication Data

US 2002/0147637 A1 Oct. 10, 2002

Related U.S. Application Data

(63) Continuation-in-part of application No. 09/617,455, filed on Jul. 17, 2000.

(51) Int. Cl.[7] .............................................. G06F 17/60
(52) U.S. Cl. ............................. 725/42; 705/14; 725/44
(58) Field of Search ...................... 705/14, 27; 709/203; 725/42, 44; 707/104.1, 501.1, 524

(56) References Cited

U.S. PATENT DOCUMENTS

| | | | |
|---|---|---|---|
| 5,918,014 A | 6/1999 | Robinson | |
| 5,937,392 A | 8/1999 | Alberts | ........................ 705/14 |
| 6,009,410 A | 12/1999 | LeMole et al. | ................ 705/14 |
| 6,014,502 A | 1/2000 | Moraes | |

*Primary Examiner*—B. James Peikari
(74) *Attorney, Agent, or Firm*—Samuel A. Kassatly

(57) ABSTRACT

An adaptive advertising system can be used in the context of an Internet environment. Transparently to the user, the system continuously operates in the background to adapt banner advertisements based on the detection of competing ads. The system includes a page analyzer that translates the hosted ad's web page into a document that can be analyzed for the presence of competing ads. An ad comparison unit compares the output of the page analyzer with information stored in the competitor ad database to detect competing ads. A design and layout evaluator detects the presence of color, texture, and animation in the competing ads. The ad summary evaluator identifies competing ads and devises a counter strategy for banner ad display. An ad display generator creates the enhanced multimedia banner ad based on the strategy determined by the ad summary evaluator. An ad web server transmits the new ad to the banner display module for display in place of the initial banner ad.

25 Claims, 4 Drawing Sheets

SYSTEM AND METHOD FOR DYNAMICALLY OPTIMIZING A BANNER ADVERTISEMENT TO COUNTER COMPETING ADVERTISEMENTS

CROSS-REFERENCE TO RELATED APPLICATION

This application is a continuation-in-part application of the co-pending U.S. patent application Ser. No. 09/617,455, titled "System and Method for Dynamically Adapting a Banner Advertisement to the Content of a Web Page," filed on Jun. 17, 2000, assigned to the same assignee as the present application, and incorporated herein by reference in its entirety.

FIELD OF THE INVENTION

The present invention relates to the field of data processing. Particularly, this invention relates to a software system and associated method for use in e-commerce advertising with a search engine that searches data maintain in systems which are linked together over an associated network such as the Internet. More specifically, this invention pertains to a computer software product for dynamically adapting, enhancing, and optimizing the appearance and content of a banner advertisement based on the automatic detection of competing advertising within a document.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the user's search terms, and returns the search of results in the form of web pages.

Currently, many web pages contain advertisements that assume various forms such as banner ads (or advertisements) across the top or bottom of the page. Such banner ads may include scrolled information containing images that change with time. Disadvantageously, from an advertiser's perspective, web users have a tendency to mentally "tune-out" such advertisements as they read or interact with the information displayed on the main work area of a page. Furthermore, by utilizing a portion of the valuable "real estate" on a web page for advertisement, the remaining available work area on the page is reduced from its maximum full-screen capabilities.

Banner ads can use text, still, or moving graphics, or multimedia messages, and typically serve as hypertext links such that the user is linked to other specified pages if the user clicks on the banner ads. Banner ads can be categorized as corporate image ads or as information ads. The main purpose of corporate image ads is to enhance the visibility and public image of a business enterprise and to reflect its presence, participation and involvement in a particular domain. The information banner ads highlight a specific product, service, or content, and provide a URL link to corresponding content information pages.

The context in which the banner ads appear directly affects consumer interest in the advertisement. For example, a banner ad for computer sales generates more consumer response when placed in an editorial content section addressing computer issues than in one that addresses automobiles. However, banner ads promoting competing products or corporations may appear on the same web page. Advertisers are typically able to select the context in which their banner ad will appear (i.e., "computer shopping") but unable to select actual ad placement. In addition, the advertiser does not know which competing ads might appear on the same document or web page until the document is displayed in the user's browser.

Ad server technology selects the placement of the banner ads based on a variety of factors. An ad server typically determines the time, location, method, and frequency of selecting a specific ad. As examples:

a company wishes to have its ads placed within a specific time period (e.g. from 4 PM to 8 PM local time);

a company wishes to have its ads associated with a particular search result item on a search result page; and/or a company wishes to have its ads displayed at least 2000 times per hour. An exemplary ad server technology is described in U.S. patent application Ser. No. 09/617, 455, supra.

There is therefore a need for a computer software product that dynamically adapts, enhances, and optimizes the display content, design, and overall communication style of a banner advertisement based on the automatic detection of competing advertising within a document.

SUMMARY OF THE INVENTION

The adaptive advertising system and associated method of the present invention satisfy this need. The adaptive ad system dynamically adapts the content of a banner ad to the advertising environment of the web pages on which it is displayed by automatically identifying and analyzing competing ads and restructuring the banner ad's content and design.

The adaptive ad system responds to other ads based on ad category, targeted audience, and competition for audience or sales. Initially, the adaptive ad system will display either a standard content or no content at all. Displaying an ad with no content allows the advertiser to operate in "stealth mode,"

i.e., to gain information about competing ads without the competitor's knowledge.

The banner ad system focuses its analysis on key competitors. In the absence of competitors, the system integrates the information gleaned from all the ads on the page (or document) to devise a counter display strategy. The system creates new ad content based on the analysis of the embedded web page, and incorporates changes in the original layout, color, design, content and animation. This new ad design maximizes the visibility of the banner ad relative to competing advertisements.

The strategy for creating new ads to counter the competing advertisement is based on pre-defined rules. To provide flexibility in customizing the appearance and content of the ad, each hosted ad includes its own associated set of strategy rules. Treating each hosted ad individually also allows the advertiser to host more than one adaptive ad on a web page.

The foregoing and other features and advantages of the present invention are realized by an adaptive advertising system that can be used in the context of an Internet environment. Transparently to the user, the system continuously operates in the background to adapt banner advertisements in response to the content and design of other ads appearing on the same web page.

The system is generally comprised of the following components: an ad web server, an ad identification manager, optionally a hosted ad database, a page analyzer, an ad comparison unit, optionally a competitor ad database, an OCR engine, an audio/video engine, a design and layout evaluator, an ad summary evaluator, optionally an ad rules database, an ad display generator, and optionally an alternate ad design database. While these components are illustrated and desribed as being distributed among the client's side, the server, and on the advertiser's side, it should be clear that at least some of these components and/or the functions associated therewith can be redistributed without affecting the performance or scope of the present invention.

In order to analyze the web page of the hosted ad, the adaptive advertising system of the present invention simulates web browser functionality using pattern matching to extract the desired source URL of the competing ad images. The adaptive advertising system also executes client-side scripts to retrieve the proper URLs of a multimedia source, if required to detect the presence of competing ads. In addition, an OCR engine converts image data to text data to extract the maximum amount of information about the competing advertisement. For competing advertisements with more sophisticated multimedia content, adaptive advertising system uses audio and video summarization techniques to extract data from the competing advertisement.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
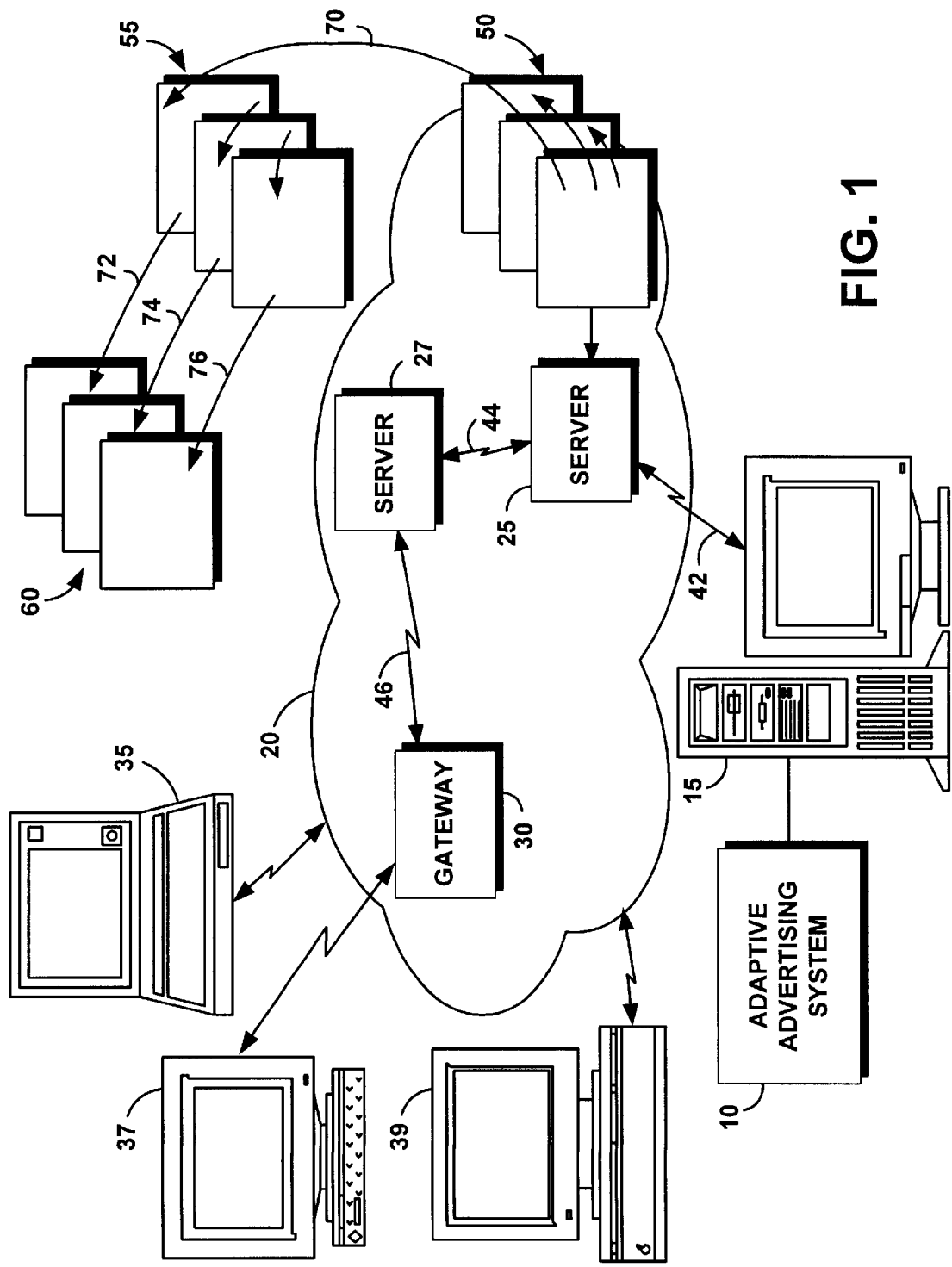
FIG. 1 is a schematic illustration of an exemplary operating environment in which an adaptive advertising system of the present invention may be used.

The following definitions and explanations provide background information pertaining to the technical field of the present invention, and are intended to facilitate the understanding of the present invention without limiting its scope:

Banner advertisement (or ad): A message, usually but not necessarily displayed for a fee, and associated with products and/or services offered by an advertiser.

Competing advertisements (or ads): Advertisements from the client's competitors.

Crawler: A program that automatically explores the World Wide Web by retrieving a document and recursively retrieving some or all the documents that are linked to it.

Dictionary: A database of context-related terms. A domain specific dictionary includes domain specific repositories such as a dictionary, a thesaurus, and other similar data stores.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

OCR: Optical character recognition.

Search engine: A remotely accessible World Wide Web tool that allows users to conduct keyword searches for information on the Internet.

Server: A software program or a computer that responds to requests from a web browser by returning ("serving") web documents.

SOAP (Simple Object Access Protocol): A protocol that provides a way for applications to communicate with each other over the Internet, independent of platform, or the underlying hardware or software for a system.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

FIG. 1 portrays the overall environment in which an adaptive advertising system 10 according to the present invention can be used. The system 10 includes a software or computer program product that is typically embedded within, or installed, at least in part, on a host server 15. Alternatively, the system 10 can be saved on a suitable storage medium such as a diskette, a CD, a hard drive, or like devices. While the system 10 will be described in connection with the WWW, the system 10 can be used with a stand-alone database of documents that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext links to other locally stored pages, and hypertext links, i.e., 70, 72, 74, 76 to other webs sites or documents 55, 60 that are stored by various web servers such as the server 27.

Figure 2:
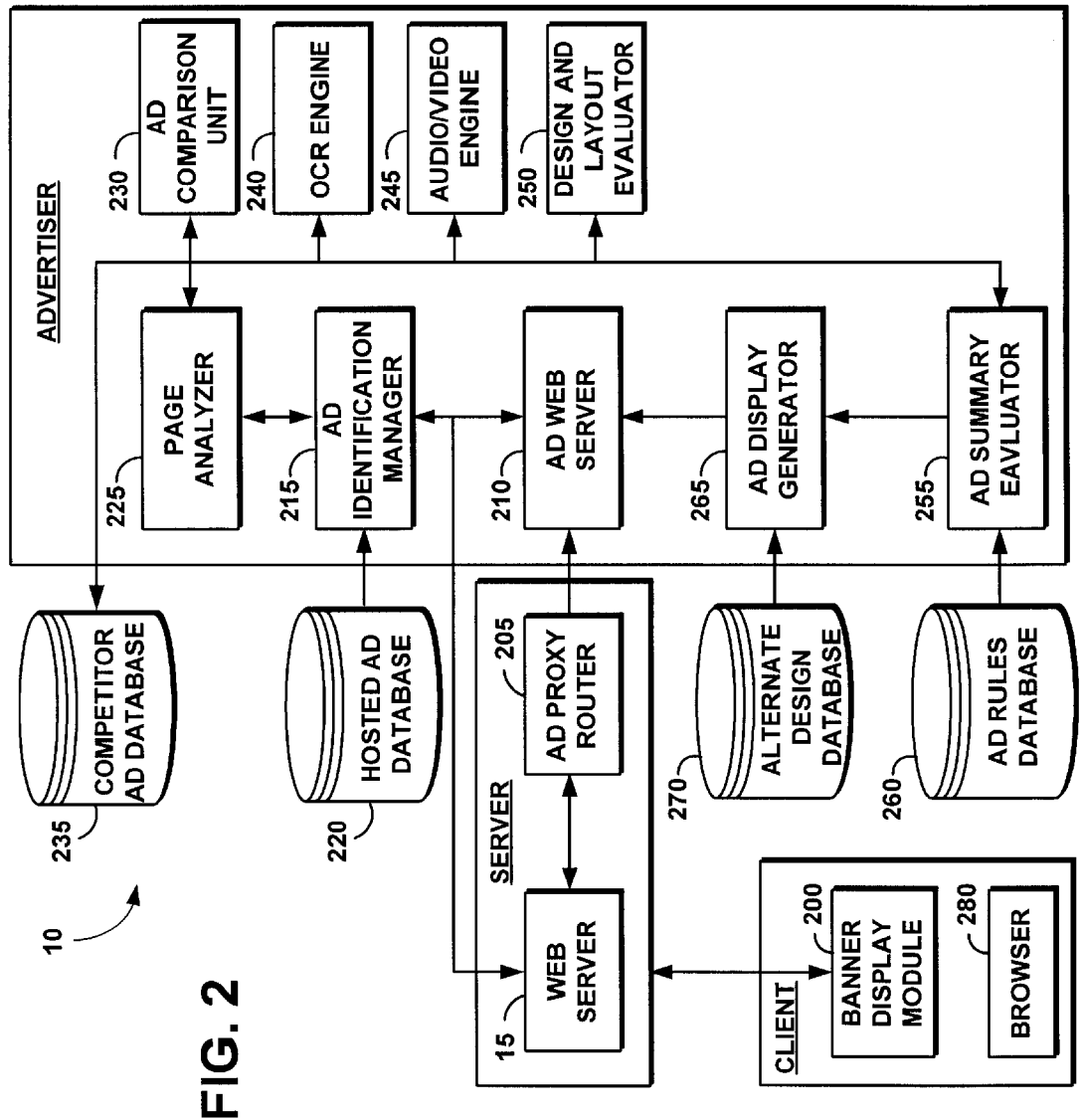
FIG. 2 is a more detailed block diagram of the adaptive advertising system of FIG. 1.

FIG. 2 illustrates a high level architecture showing the adaptive advertising system 10 used in the context of an Internet environment. The system 10, transparently to the user, continuously or periodically operates in the background to adapt banner advertisements in response to the presence of competing ads.

In one embodiment, the system 10 operates with a banner display module 200 that displays the content of the adaptive banner ad, a web server 15, and an ad proxy router 205 that provides secure communication link between banner display module and the advertiser's server, and is generally comprised of:

an ad identification manager 215 that performs competitive analysis of all the ads on the hosted ad's web page;

an ad web server 210 that serves HTTP (or other protocols) requests from the ad proxy router 205 to an ad identification manager 215 using, for example, available technology, wherein the server 15 serves HTTP (or other protocols) requests from the banner display module 200 or the ad identification manager 215 and passes those requests to the ad proxy router 205;

a hosted ad database 220 that contains information about each banner ad hosted, including primary competitors;

a page analyzer 225 that translates the hosted ad's web page into a document that can be analyzed for the presence of competing advertising;

a competitor ad database 235 that contains data about competing advertising;

an ad comparison unit 230 that compares the output of the page analyzer 225 with information stored in the competitor ad database 235 to detect competing advertising;

an OCR engine 240 that applies OCR techniques to the document constructed by the page analyzer 225 to detect competing advertising in complex multimedia web environments;

an audio/video engine 245 that uses available audio and video summarization techniques such as those provided by IBM's CueVideo research project (www.almaden.ibm.com/cs/cuevideo) to extract data from the competing banner advertisement;

a design and layout evaluator 250 that uses, for example, available image processing techniques to detect the presence of color, texture, and animation in competing advertising, so that the advertiser's banner advertisement can be designed with maximum visual contrast and efficacy;

an ad summary evaluator 255 that identifies competing advertising and that devises counter strategy for banner ad display;

an ad rules database 260 that contains the rules used to devise counter strategy for displaying banner advertising according to the present invention;

an ad display generator 265 that creates a multimedia banner ad based on the strategy determined by the ad summary evaluator 255; and an alternate ad design database 270 that contains templates and designs for alternate banner ads to be exchanged for the original hosted ad.

Figure 3:
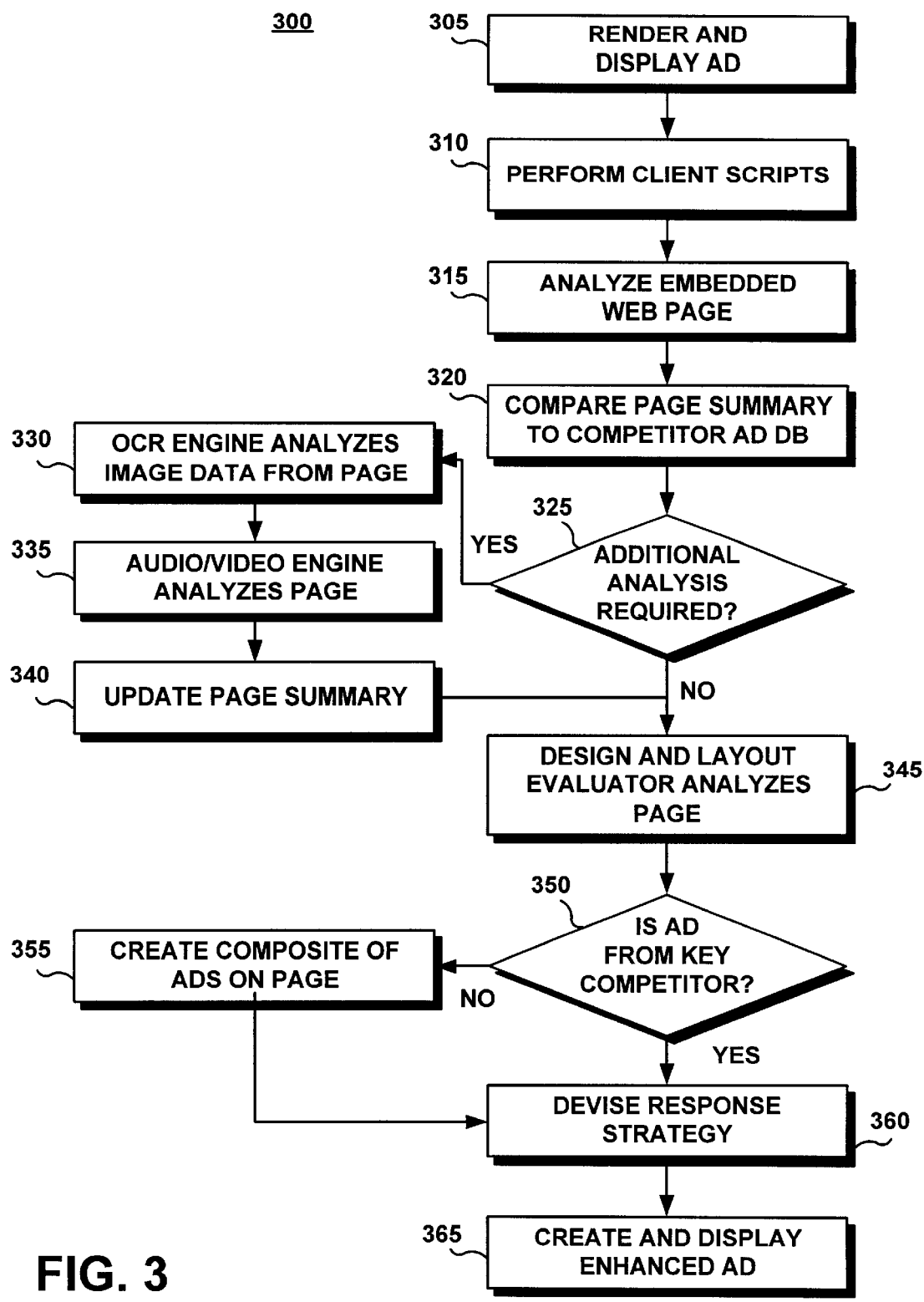
FIG. 3 is a flow chart that depicts the operation of the adaptive advertising system of FIGS. 1–2.

Having described the main components of the system 10, its operation will now be described in connection with FIG. 3. FIG. 3 illustrates an exemplary method of operation 300 wherein the banner display module 200 renders and displays the content of a standard banner ad at step 305. Alternatively, at step 305, the adaptive advertising system 10 may choose to suppress the ad until the web page has been analyzed for competing ads. Suppressing the ad's content allows the system 10 to operate in "stealth mode".

The banner display module 200 is preferably implemented in Java® as an applet in combination with scripting languages such as JavaScript® within the context of a web browser (e.g. E Microsoft Internet Explorer® or Netscape Navigator®). Other technologies that allow client side code execution within a web browser environment can also be used such as ActiveX®.

After initializing through the client's web browser 280 (FIG. 2), the banner display module 200 sends a data stream containing the following information to the ad proxy router 205:

the URL for the hosted ad's web page; and an ad ID identifying the hosted ad to the system 10.

An advertiser may have multiple ads hosted on the same page, and consequently the ad identification manager 215 needs to know which hosted ad requires a comparison analysis. The ad ID can also be used to retrieve additional information about the advertisement from the hosted ad database 220. Exemplary information includes ad category, targeted audience, typical competitors for the advertised product, and so forth. Furthermore, advertising strategy can be associated with a hosted ad to provide more flexibility in customizing the appearance and the content of the enhanced banner ad.

The ad proxy router 205 communicates between the banner display module 200 and the ad web server 210 using for example the single object access protocol (SOAP). The presence of an intermediary system such as the ad proxy router 205 is desirable to maintain security when running Java applets or other executable code within a web browser. Typically, these applets only communicate with the web server 15. However, since the adaptive advertising system 10 is not typically hosted on the same web server as the banner display module 200, the ad proxy router 205 acts as an intermediary by forwarding requests to, and returning results from the system 10. Reference is made to U.S. patent application Ser. No. 09/617,455, supra.

The ad web server 210 processes the data stream from the ad proxy router 205 and forwards the same to the ad identification manager 215 with a request to perform a competitive analysis of the web page. The ad identification manager 215 requests the page analyzer 225 to download the web page document using the URL.

The page analyzer 225 begins the process of adapting the banner ad at step 310 by executing all the necessary client scripts. The page analyzer 225 essentially simulates web browser functionality. However, rather than rendering the document for viewing by a user, the page analyzer 225 constructs a document to analyze. In simpler cases, multi-media banner ads could simply be images. Since HTML provides an <IMG> tag to mark images, pattern matching is then used by the page analyzer 225 to extract the desired source URL of the image. In more complex cases, multi-media content is the result of client script execution.

Therefore, the page analyzer 225 has to execute client scripts first in order to retrieve the proper URLs of a multimedia resource. The page analyzer 225 executes the JavaScript® algorithm to retrieve the proper multimedia source URLs, as shown in the following illustration containing a script for the dynamic generation of multimedia resource URLs:

```
<SCRIPT LANGUAGE="javascript">
<!- -
document.writeln('<img
  src="http://ak.buy.com/buy_assets/comp/images/
    space.gif" width="1"
  height="13" border="0"><br>');
document.writeln('<A
  HREF="http://ad.doubleclick.net/jump/buy.prod.sm/
    homepage;cat=corpprod_3;sz=100x60;tile=3;ord='+
    adRandomOrd+'?">');
document.writeln('<IMG
  SRC="http://ad.doubleclick.net/ad/buy.prod.sm/
    homepage;cat=corpprod_3;sz=100x60;tile=3;ord='+
    adRandomOrd+'?"border="0" width="100"
  height="60"></A>');
document.writeln('<br><img
  src="http://ak.buy.com/buy_assets/comp/images/
    space.gif" width="1"
  height="13" border="0"><br>');
document.writeln('<A
  HREF="http://ad.doubleclick.net/jump/
    buy.homepage.sm/homepage;cat=homepage_4;sz=
    100x60;tile=4;ord='+adRandomOrd+'?" TARGET=
    "_NEW">');
document.writeln('<IMG
  SRC="http://ad.doubleclick.net/ad/buy.homepage.sm/
    homepage;cat=homepage_4;sz=100x60;tile=4;ord='+
    adRandomOrd+'?" border="0" width="100"
  height="60"></A>');
document.writeln('<br><img
  src="http://ak.buy.com/buy_assets/comp/images/
    space.gif" width="1"
  height="13" border="0"><br>');
document.writeln('<A
  HREF="http://ad.doubleclick.net/jump/buy.coop.sm/
    homepage;cat=homepage_5;sz=100x60;tile=5;ord='+
    adRandomOrd+'?">');
document.writeln('<IMG
  SRC="http://ad.doubleclick.net/ad/buy.coop.sm/
    homepage;cat=homepage_5;sz=100x60;tile=5;ord='+
    adRandomOrd+'?" border=0" width="100"
  height="60"></A>');
document.writeln('<br><img
  src="http://ak.buy.com/buy_assets/comp/images/
    space.gif" width="1"
  height="13" border="0"><br>');
document.writeln('<A
  HREF="http://ad.doubleclick.net/jump/buy.coop.sm/
    homepage;cat=homepage_6;sz=100x60;tile=6;ord='+
    adRandomOrd+'?">');
document.writeln('<IMG
  SRC="http://ad.doubleclick.net/ad/buy.coop.sm/
    homepage;cat=homepage_6;sz=100x60;tile=6;ord='+
    adRandomOrd+'?" border="0" width="100"
  height="60"></A>'):
//- ->
</SCRIPT>
```

In the foregoing example, lines containing images are highlighted in bold. The <IMG> tag comprises the attribute "SRC", which represents the URL of the image.

Returning now to step 315 of FIG. 3, the page analyzer 225 eliminates scripting and resolves dynamic URLs as it analyzes the web page. The result of the analysis is a document that contains the multimedia resources identified as potential competing advertisers.

Figure 4:
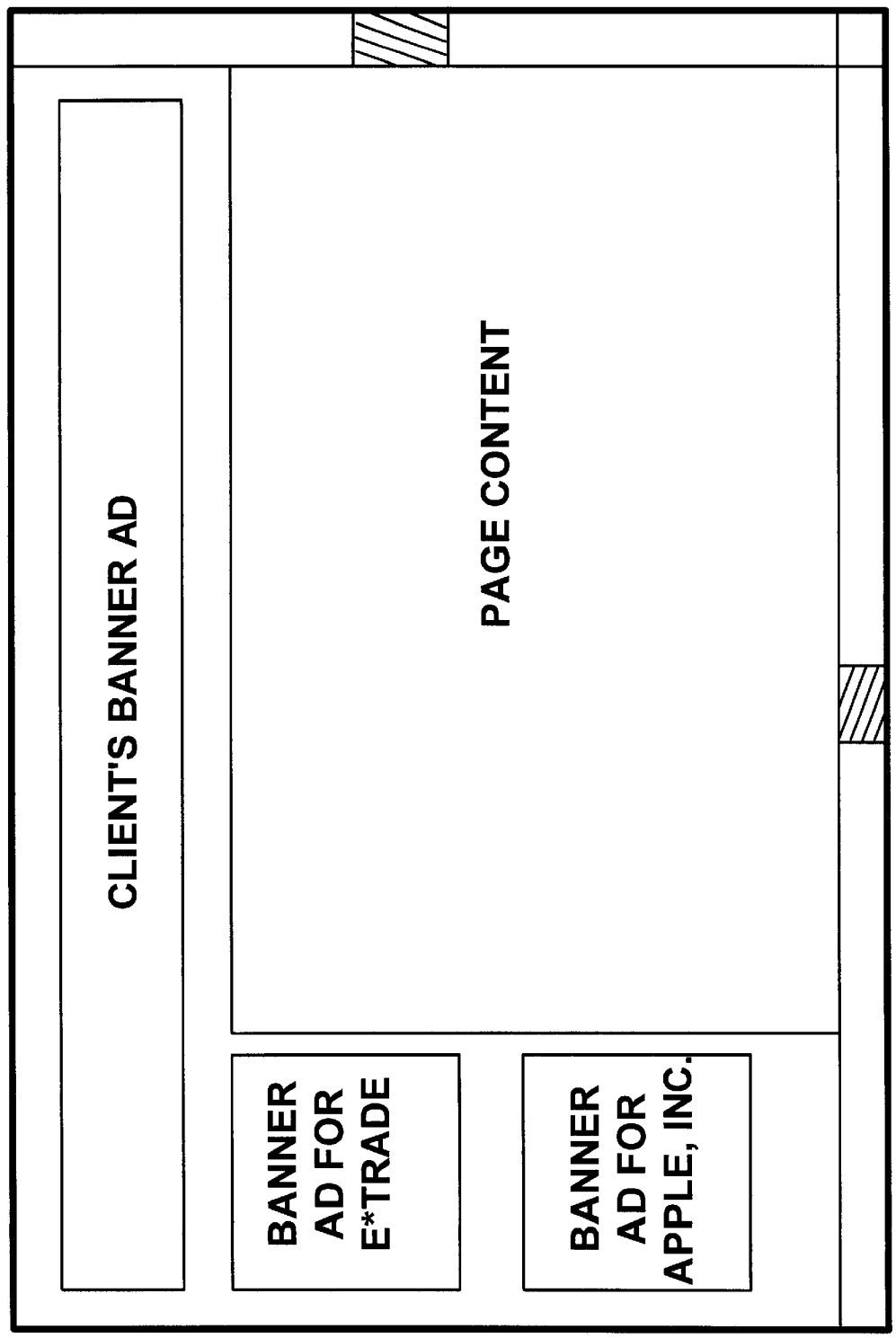
FIG. 4 illustrates a web page with competing advertising to be analyzed by the adaptive advertisement system of FIGS. 1–2.

FIG. 4 illustrates an exemplary web page containing several competing advertisements. The hosted ad in this case is Intel®, other advertisers are E*trade® and the Mac Store. At step 315, the page analyzer 225 creates an XML representation of the document's multimedia resources, illustrated as follows:

```
<AD_URL>http://www.us.buy.com/default.asp</AD_URL>
<AD_ID id="38293829">
<MEDIA_URL>http://ad.doubleclick.net/ad/buy.prod.sm/homepage;cat=homepage
_6;sz=100x60;tile=6;ord=16115127561</MEDIA_URL>
<TARGET_URL>http://ad.doubleclick.net/jump/buy.prod.sm/homepage;cat=homep
age_6;sz=100x60;tile=6;ord=16115127561</TARGET_URL>
    </AD_ID>
    <POTENTIAL_AD_COMPETITORS>
        <POT_COMPETITOR>
<MEDIA_URL>http://ad.doubleclick.net/ad/buy.prod.sm/homepage;cat=corpprod
_3;sz=100x60;tile=3;ord=16115127561</MEDIA_URL>
<TARGET_URL>http://ad.doubleclick.net/jump/buy.prod.sm/homepage;cat=corpp
rod_3;sz=100x60;tile=3;ord=16115127561</TARGET_URL>
        </POT_COMPETITOR>
        <POT_COMPETITOR>
<MEDIA_URL>http://ad.doubleclick.net/ad/buy.prod.sm/homepage;cat=homepage
_4;sz=100x60;tile=4;ord=16115127561</MEDIA_URL>
<TARGET_URL>http://ad.doubleclick.net/jump/buy.prod.sm/homepage;cat=homep
age_4;sz=100x60;tile=4;ord=16115127561</TARGET_URL>
        </POT_COMPETITOR>
        <POT_COMPETITOR>
<MEDIA_URL>http://ad.doubleclick.net/ad/buy.prod.sm/homepage;cat=homepage
_5;sz=100x60;tile=5;ord=16115127561</MEDIA_URL>
<TARGET_URL>http://ad.doubleclick.net/jump/buy.prod.sm/homepage;cat=homepage
age_5;sz=100x60;tile=5;ord=16115127561</TARGET_URL>
        </POT_COMPETITOR>
        ... (more)
</POTENTIAL_AD_COMPETITORS>
```

Certain multimedia resources such as space.gif are not listed in the page summary because they represent blank space; these resources are removed based on file name conventions. In addition, images without an associated URL are not retained since the image of interest is a banner ad that will have a URL for the user to follow.

As illustrated in the foregoing example, the page analyzer 225 also extracts keywords and alternate representations from the web page and adds them to the page summary. Many web designers use a text placeholder as an alternate representation for any image in case a user has turned off images in the browser/environment for faster download. This alternate representation often contains useful data for each multimedia source. However, in the example above, no additional information is represented.

At this point, the page analyzer 225 can also download the target URLs of each potential candidate and analyze these documents. Typically, these documents contain useful information (e.g. page title, abstracts etc.) that can be used to enrich the metadata of the summary document and to provide additional insights to the origination of the ads and images on the web page. By performing this analysis on the web page of FIG. 4, the enhanced XML representation of the multimedia resources of FIG. 4 becomes as follows:

```
<AD_URL>http://www.us.buy.com/default.asp</AD_URL>
<AD_ID id="38293829">
<MEDIA_URL>http://ad.doubleclick.net/ad/buy.prod.sm/homepage;cat=homepage
_6;sz=100x60;tile=6;ord=16115127561</MEDIA_URL>
<TARGET_URL>http://ad.doubleclick.net/jump/buy.prod.sm/homepage;cat=homepage
age_6;sz=100x60;tile=6;ord=16115127561</TARGET_URL>
    </AD_ID>
    <POTENTIAL_AD_COMPETITORS>
        <POT_COMPETITOR>
<MEDIA_URL>http://ad.doubleclick.net/ad/buy.prod.sm/homepage;cat=corpprod_
3;sz=100x60;tile=3;ord=16115127561</MEDIA_URL>
<TARGET_URL>http://ad.doubleclick.net/jump/buy.prod.sm/homepage;cat=corpprod_
3;sz=100x60;tile=3;ord=16115127561</TARGET_URL>
            <title>buy.com - The Internet Superstore</title>
            <Keywords>Free Shipping, Internet, Store</KEYWORDS>
        </POT_COMPETITOR>
        <POT_COMPETITOR>
<MEDIA_URL>http://ad.doubleclick.net/ad/buy.prod.sm/homepage;cat=homepage_
4;sz=100x60;tile=4;ord=16115127561</MEDIA_URL>
<TARGET_URL>http://ad.doubleclick.net/jump/buy.prod.sm/homepage;cat=homepage
_4;sz=100x60;tile=4;ord=16115127561</TARGET_URL>
            <TITLE>E*TRADE</TITLE>
            <KEYWORDS>trading, stocks</KEYWORDS>
        </POT_COMPETITOR>
        <POT_COMPETITOR>
<MEDIA_URL>http://ad.doubleclick.net/ad/buy.prod.sm/homepage;cat=homepage_
5;sz=100x60;tile=5;ord=16115127561</MEDIA_URL>
<TARGET_URL>http://ad.doubleclick.net/jump/buy.prod.sm/homepage;cat=homepage
_5;sz=100x60;tile=5;ord=16115127561</TARGET_URL>
```

-continued

```
    <title>BUYCOMP.COM - The Computer Superstore</title>
    <KEYWORDS>macintosh, mac, store</KEYWORDS>
  </POT_COMPETITOR>
  ... (more)
</POTENTIAL_AD_COMPETITORS>
```

With this additional analysis, the page analyzer 225 retrieves the document title and other useful keywords, as highlighted in bold.

The page analyzer 225 now passes the page summary to the ad comparison unit 230 at step 320 of FIG. 3, to determine if the competitor ad database 235 recognizes any of the candidate ads as competitors' ads. The competitor ad database 235 contains data about competitors' advertisements that have collected from the various advertisers and entered either manually or automatically.

This data comprises a sample of the ad (e.g. an image) along with additional data useful for ad analysis. The system 10 performs database queries utilizing available image/multimedia comparison algorithms to locate a match. For the example of FIG. 4, the ad comparison unit 230 detects a match and the ad for the Mac Store is marked in the summary list as a might be necessary, and method 300 proceeds to step 345 as it will be described later.

If, however, none of the identified candidates are competitors, other unidentified competitors may still reside on the web page. Consequently, a supplemental analysis might be required, and the page analyzer 225 invokes the OCR engine 240 at step 330 to convert the image data into text data. Performing OCR analysis on the web page retrieves additional information that can enhance the XML representation of potential candidates.

The OCR techniques require a digital image as a resource, such as a JPEG, TIFF, etc. For more sophisticated multimedia content, the system 10 invokes the audio/video engine 245 at step 335 to extract additional data from the web page.

```
<MATCHED_COMPETITOR>:
<COMPETITOR id=4711>
<MEDIA_URL>http://ad.doubleclick.net/ad/buy.prod.sm/homepage;cat=homepage
_5;sz=100x60;tile=5;ord=16115127561</MEDIA_URL>
<TARGET_URL>http://ad.doubleclick.net/jump/buy.prod.sm/homepage;cat=homep
age_5;sz=100x60;ti1e=5;ord=16115127561</TARGET_URL>
        <title>BUYCOMP.COM - The Computer Superstore</title>
        <KEYWORDS>macintosh, mac, store</KEYWORDS>
        <MATCHED_COMPETITOR>Apple Inc.</MATCHED_COMPETITOR>
    <COMPETITOR>
```

It is noted that <POT_COMPETITOR> is now replaced with the new <COMPETITOR id=4711> element. This element attribute id represents a key into the competitor ad database 235 that will be used by subsequent components.

The method 300 then determines at decision step 325 if an additional analysis is required. If any of the candidates are identified as key competitors, no further web page analysis The audio/video engine 245 uses standard audio and video summarization techniques.

In the example of FIG. 4, the OCR engine 240 performs OCR analysis and integrates the results into the summary document at step 340 as follows:

```
<POT_COMPETITOR>
<MEDIA_URL>http://ad.doubleclick.net/ad/buy.prod.sm/homepage;cat=homepage_
4;sz=100x60;tile=4;ord=16115127561</MEDIA_URL>
<TARGET_URL>http://ad.doubleclick.net/jump/buy.prod.sm/homepage;cat=homepage
_4;sz=100x60;tile=4;ord=16115127561</TARGET_URL>
        <TITLE>E*TRADE</TITLE>
        <KEYWORDS>trading, stocks</KEYWORDS>
        <OCR_RESULT>$100 off at buy.com E*TRADE</OCR_RESULT>
    </POT_COMPETITOR>
```

The OCR result is highlighted in bold in the example above.

The final XML representation created by the page analyzer 225 for the example of FIG. 4 is as follows:

```
<AD_URL>http://www.us.buy.com/default.asp</AD_URL>
<AD_ID id=38293829">
<MEDIA_URL>http://ad.doubleclick.net/ad/buy.prod.sm/homepage;cat=homepage_
6;sz=100x60;tile=6;ord=16115127561</MEDIA_URL>
<TARGET_URL>http://ad.doubleclick.net/jump/buy.prod.sm/homepage;cat=homepage
_6;sz=100x60;tile=6;ord=16115127561</TARGET_URL>
    </AD_ID>
    <POTENTIAL_AD_COMPETITORS>
        <POT_COMPETITOR>
<MEDIA_URL>http://ad.doubleclick.net/ad/buy.prod.sm/homepage;cat=corpprod_3;
sz=100x60;tile=3;ord=16115127561 </MEDIA_URL>
<TARGET_URL>http://ad.doubleclick.net/jump/buy.prod.sm/homepage;cat=corpprod_
3;sz=100x60;tile=3;ord=16115127561</TARGET_URL>
            <title>buy.com - The Internet Superstore</title>
            <Keywords>Free Shipping, Internet, Store</KEYWORDS>
            <OCR_RESULT>Free Shipping Store - Hot Products</OCR_RESULT>
        </POT_COMPETITOR>
        <POT_COMPETITOR>
<MEDIA_URL>http://ad.doubleclick.net/ad/buy.prod.sm/homepage;cat=homepage_
4;sz=100x60;tile=4;ord=16115127561</MEDIA_URL>
<TARGET_URL>http://ad.doubleclick.net/jump/buy.prod.sm/homepage;cat=homepage_
4;sz=100x60;tile=4;ord=16115127561</TARGET_URL>
            <TITLE>E*TRADE</TITLE>
            <KEYWORDS>trading, stocks</KEYWORDS>
            <OCR_RESULT>$100 off at buy.com E*TRADE</OCR_RESULT>
        </POT_COMPETITOR>
        <COMPETITOR id=4711>
<MEDIA_URL>http://ad.doubleclick.net/ad/buy.prod.sm/homepage;cat=homepage_
5;sz=100x60;tile=5;ord=16115127561</MEDIA_URL>
<TARGET_URL>http://ad.doubleclick.net/jump/buy.prod.sm/homepage;cat=homepage_
5;sz=100x60;tile=5;ord=16115127561</TARGET_URL>
            <title>BUYCOMP.COM - The Computer Superstore</title>
            <KEYWORDS>macintosh, mac, store</KEYWORDS>
            <MATCHED_COMPETITOR>Apple Inc.</MATCHED_
            COMPETITOR>
        <COMPETITOR>
        ... (more)
</POTENTIAL_AD_COMPETITORS>
```

The web page summary now contains all the information necessary (shown highlighted in bold letters) to define an appropriate ad strategy for the web page:

Ad ID used to identify the hosted ad in the hosted ad database 220 and associated information;

a list of all potential competitors on the web page including the media URL, target URL and additional metadata gained from document analysis or OCR shown highlighted in bold letters; and a list of competitors clearly identified by the ad comparison unit 230 as <MATCHED COMPETITOR>.

For the example of FIG. 4, the two ads found on the page are E*trade®, and Apple, Inc. The ad hosted on this page is for Intel Corporation. The ad comparison unit 230 identified Apple, Inc. as one of Intel Corporation's competitors.

At step 345, the design and layout evaluator 250 uses standard image processing techniques to detect the color of an image ad, textures, and any animation effects. Color information can be very valuable. For instance, if the system 10 knows that all other ads are using black and white only, a different color could be used to catch the eye of the user. In addition, if a competitive ad image is animated, the system 10 could use animation effects or audio to diminish the visual effect of the competitive ad.

Method 300 then determines from the hosted ad database 220, at decision step 350, if any of the ads on the web page are key competitors by having the page analyzer 225 pass the web page summary to the ad summary evaluator 255. Each hosted ad may have multiple key competitors. If a key competitor is detected on the page at step 350, the ad summary evaluator 255 develops a strategy for this key competitor. If, however, no key competitor is detected at step 350, the ad summary evaluator 255 creates an ad composite at step 355.

The strategy or strategies used by the ad summary evaluator 255 are implemented as rules that are stored in the ad rules database 260. A rules engine is used to interpret these rules. For the example of FIG. 4, the ad summary evaluator 255 identifies the Mac Store as a key competitor. The ad summary evaluator 255 ignores the other ads because they offer services in different markets and thus are not competitors. From the ad rules database 260, the ad summary evaluator 255 obtains a rule which instructs the system 10 to use a specific Mac-targeted ad instead of the original ad. This overall strategy can also be articulated using an XML or other schema.

Once the ad summary evaluator 255 devises a strategy at step 360, the ad display generator 265 builds a multimedia resource at step 365. This enhanced ad incorporates the new communication message created in response to the competing ad. The ad display generator 265 can retrieve an ad template from the alternate ad design database 270. Alternatively, the ad display generator 265 can create a new image according to ad specifications such as size. The new ad can be created utilizing a variety of methods, one of which would be to use HTML markup and an HTML-rendering engine from a web browser. The ad display generator 265 returns the enhanced ad to the ad web server 210, which then transmits it to the banner display module 200. Depending on the implementation, the entire banner ad adaptation process can take several seconds.

It is to be understood that the specific embodiments of the invention that have been described are merely illustrative of certain application of the principle of the present invention. Numerous modifications may be made to the system and method for dynamically adapting a banner advertisement to counter competing ads and associated method described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A system for dynamically adapting a client's advertisement composition based on one or more competing advertisements within a document, comprising:

an ad comparison unit that identifies the competing advertisements;

a design and layout evaluator that detects the composition of the competing advertisements identified by the ad comparison unit;

an ad summary evaluator that devises a strategy for adapting the client's advertisement based on the composition of the competing advertisements; and an ad display generator that selectively creates a modified client's advertisement based on the strategy devised by the ad summary evaluator.

2. The system of claim 1, further including a document analyzer that translates the document into a document that can be analyzed for the presence of competing advertisements.

3. The system of claim 2, further including a competitor ad database that stores a list of the client's competitors; and wherein the ad comparison unit compares the output of the document analyzer with information stored in a competitor ad database to detect competing advertisements.

4. The system of claim 2, wherein the design and layout evaluator detects any one or more characteristics of the competing advertisements: color, texture, animation.

5. The system of claim 2, further including an ad web server that transmits the modified client's advertisement to the ad display generator for display to the client.

6. The system of claim 1, wherein the ad summary evaluator devises the strategy based on any one or more of: ad category, targeted audience, or competition for audience or sales of the competing advertisements.

7. The system of claim 1, wherein the ad display generator operates in a "stealth mode".

8. The system of claim 1, wherein the ad comparison unit identifies only key competitors' advertisements.

9. The system of claim 1, wherein the the ad display generator creates the modified client's advertisement based on a pre-defined rule.

10. The system of claim 1, wherein the document includes a web page.

11. The system of claim 1, further including an ad identification manager that performs competitive analysis of the advertisements hosted by the document.

12. The system of claim 1, further including a recognition engine that further detects competing advertisements in a multimedia web environment.

13. The system of claim 1, further including an audio/video engine that extracts any of audio or video data from the competing advertisements.

14. The system of claim 1, further including an ad rules database that contains rules used by the ad summary evaluator to devise the strategy.

15. A computer software program for dynamically adapting a client's advertisement composition based on one or more competing advertisements within a document, comprising:

an ad comparison means for identifying the competing advertisements;

a design and layout evaluator means for detecting the composition of the competing advertisements;

an ad summary evaluator means for devising a strategy to adapt the client's advertisement based on the composition of the competing advertisements; and an ad display generator means for selectively creating a modified client's advertisement based on the strategy.

16. The system of claim 15, further including a document analyzer means for translating the document into a document that can be analyzed for the presence of competing advertisements.

17. The system of claim 16, further including a competitor ad database that stores a list of the client's competitors; and wherein the ad comparison means compares the output of the document analyzer means with information stored in a competitor ad database to detect competing advertisements.

18. The system of claim 16, wherein the design and layout evaluator means detects any one or more characteristics of the competing advertisements: color, texture, animation; and further including an ad web server that transmits the modified client's advertisement to the ad display generator means for display to the client.

19. The system of claim 15, wherein the ad summary evaluator means devises the strategy based on any one or more of: ad category, targeted audience, or competition for audience or sales of the competing advertisements.

20. The system of claim 15, wherein the the ad display generator means creates the modified client's advertisement based on a pre-defined rule.

21. A method for dynamically adapting a client's advertisement composition based on one or more competing advertisements within a document, comprising:

identifying the competing advertisements;

detecting the composition of the competing advertisements;

devising a strategy for adapting the client's advertisement based on the composition of the competing advertisements; and selectively creating a modified client's advertisement based on the strategy devised by the ad summary evaluator.

22. The system of claim 21, further including translating the document into a document that can be analyzed for the presence of competing advertisements.

23. The system of claim 22, further including storing a list of the client's competitors; and using the list to detect competing advertisements.

24. The system of claim 22, wherein the step of detecting the composition of the competing advertisements includes detecting any one or more characteristics of the competing advertisements: color, texture, animation.

25. The system of claim 22, further including the step of recognizing competing advertisements in a multimedia web environment.

\* \* \* \* \*